United States Patent
Kumar

(10) Patent No.: US 12,223,064 B2
(45) Date of Patent: Feb. 11, 2025

(54) MECHANISM TO SECURE AN EXECUTION ENVIRONMENT IN PROCESSOR CORES

(71) Applicant: QUALCOMM Incorporated, San Diego, CA (US)

(72) Inventor: Sachin Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/933,866

(22) Filed: Sep. 21, 2022

(65) Prior Publication Data

US 2024/0095375 A1    Mar. 21, 2024

(51) Int. Cl.
| | |
|---|---|
| *H04L 29/06* | (2006.01) |
| *G06F 21/53* | (2013.01) |
| *G06F 21/54* | (2013.01) |
| *G06F 21/60* | (2013.01) |
| *G06F 21/10* | (2013.01) |

(52) U.S. Cl.
CPC ............ *G06F 21/602* (2013.01); *G06F 21/53* (2013.01); *G06F 21/54* (2013.01); *G06F 21/107* (2023.08)

(58) Field of Classification Search
None
See application file for complete search history.

(56) References Cited

U.S. PATENT DOCUMENTS

| | | | | |
|---|---|---|---|---|
| 7,685,596 B1 * | 3/2010 | Webb | ............... | G06F 16/13 717/172 |
| 8,225,104 B1 * | 7/2012 | Satish | ............... | G06F 21/53 709/225 |
| 8,250,664 B2 * | 8/2012 | Yamaguchi | ............ | H04N 5/913 713/193 |
| 9,134,966 B2 * | 9/2015 | Brock | ............... | G06F 8/44 |
| 9,256,756 B2 * | 2/2016 | Lin | ............... | G06F 21/6209 |
| 10,637,877 B1 * | 4/2020 | Ramanathan | ......... | G06F 21/556 |
| 12,032,684 B2 * | 7/2024 | Kaufmann | ............ | G06F 11/263 |
| 2016/0162686 A1 | 6/2016 | Nam et al. | | |

(Continued)

OTHER PUBLICATIONS

International Search Report and Written Opinion—PCT/US2023/029072—ISA/EPO—Nov. 8, 2023 11 pages.

*Primary Examiner* — Maung T Lwin
(74) *Attorney, Agent, or Firm* — Muncy, Geissler, Olds & Lowe, P.C./QUALCOMM

(57) ABSTRACT

Various embodiments include methods and devices for a secure execution environment in computing devices. Embodiments may include generating a binary executable file for execution in the secure execution environment by generating hashes of instructions of a function, inserting a start hash instruction and a stop hash instruction in object code of the function, and generating a binary executable having the function including the start hash instruction and the stop hash instruction. Embodiments may include implementing the secure execution environment by generating hashes of instructions of a function in parallel with executing the function, comparing the generated hashes of the instructions of the function to stored hashes of instructions of the function, and issuing an exception indicating to a processor that execution of the function is not secure for any difference between the generated hashes of the instructions of the function and the stored hashes of the instructions of the function.

14 Claims, 10 Drawing Sheets

(56) References Cited

U.S. PATENT DOCUMENTS

| | | |
|---|---|---|
| 2021/0209201 A1* | 7/2021 | Ge .......................... G06F 21/54 |
| 2021/0218562 A1 | 7/2021 | Grobelny et al. |
| 2022/0121770 A1* | 4/2022 | Cousins ................ H04L 9/0643 |

* cited by examiner

MECHANISM TO SECURE AN EXECUTION ENVIRONMENT IN PROCESSOR CORES

BACKGROUND

A secure execution environment is a platform offered in central processor unit (CPU) cores for providing a high level of trust of code executing in this environment such that threats from other areas of a computing device can be ignored. Currently, secure execution environments implement an isolation zone in hardware, such as trust zone, where the code is supposed to execute in elevated privileged modes of execution. Also, secure execution environments implement a combination of hardware and software, such as signing an ELF offline and authenticating the signed ELF by a coprocessor before executing an image, generated from the signed ELF, on a target processor.

SUMMARY

Various disclosed aspects include apparatuses and methods of generating a binary executable file for execution in a secure execution environment. Various aspects may include generating hashes of instructions of a function, inserting a start hash instruction and a stop hash instruction in object code of the function, and generating a binary executable having the function including the start hash instruction and the stop hash instruction.

In some aspects, inserting the start hash instruction and the stop hash instruction in the object code of the function may include inserting the start hash instruction in a prologue of the function, and inserting the stop hash instruction in an epilogue of the function.

Some aspects may further include encrypting a program header for the hashes of the instructions of the function, and storing the encrypted program header for the hashes of the instructions of the function to a dedicated memory.

Some aspects may further include receiving an indication of a hash algorithm using a software development toolchain, in which generating the hashes of the instructions of the function may include generating the hashes of the instructions of the function using the indicated hash algorithm (i.e., identified in the indication of the hash algorithm).

Some aspects may further include receiving a private key using a software development toolchain, and encrypting a program header for the hashes of the instructions of the function using an encryption algorithm and the private key.

Some aspects may further include receiving an indication of an encryption algorithm using a software development toolchain, and encrypting a program header for the hashes of the instructions of the function using the indicated encryption algorithm (i.e., identified in the indication of the encryption algorithm).

In some aspects, generating the hashes of the instructions of the function may include generating the hashes of the instructions of the function using an assembler, inserting a start hash instruction and a stop hash instruction in the object code of the function may include inserting the start hash instruction and the stop hash instruction in the object code of the function using the assembler, and generating the binary executable having the function including the start hash instruction and the stop hash instruction may include generating the binary executable having the function including the start hash instruction and the stop hash instruction using a linker.

Further aspects include apparatuses and methods performed at a secure execution environment of a processor at runtime to maintain the secure execution environment. Such aspects may include generating hashes of instructions of a function in parallel with executing the function, comparing the generated hashes of the instructions of the function to stored hashes of instructions of the function, and issuing an exception indicating to the processor that execution of the function is not secure for any difference between the generated hashes of the instructions of the function and the stored hashes of the instructions of the function.

Some aspects may further include determining whether a start hash instruction exists for the function, in which generating the hashes of the instructions of the function in parallel with executing the function may include generating the hashes of the instructions of the function in response to determining that the start hash instruction exists for the function, and issuing an exception indicating to the processor that execution of the function is not secure in response to determining that the start hash instruction does not exist for the function.

Some aspects may further include determining whether to end generating the hashes of the instructions of the function based on reaching a stop hash instruction for the function, in which comparing the generated hashes of the instructions of the function to stored hashes of the instructions of the function occurs in response to determining to end generating the hashes of the instructions of the function.

Some aspects may further include determining whether the secure execution environment is enabled for the processor, in which generating the hashes of the instructions of the function in parallel with executing the function occurs in response to determining that the secure execution environment is enabled for the processor.

Some aspects may further include decrypting an encrypted stored program header for hashes of instructions of the function generating a decrypted program header for hashes of the instructions of the function, and retrieving stored hashes of the instructions of the function from a dedicated memory based on the decrypted program header for hashes of the instructions of the function.

Some aspects may further include determining whether the encrypted stored program header for hashes of the instructions of the function exist in the dedicated memory, in which decrypting the encrypted stored program header for hashes of the instructions of the function occurs in response to determining that the encrypted stored program header for hashes of the instructions of the function exist in the dedicated memory.

Further aspects include a computing device having a processing device configured to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
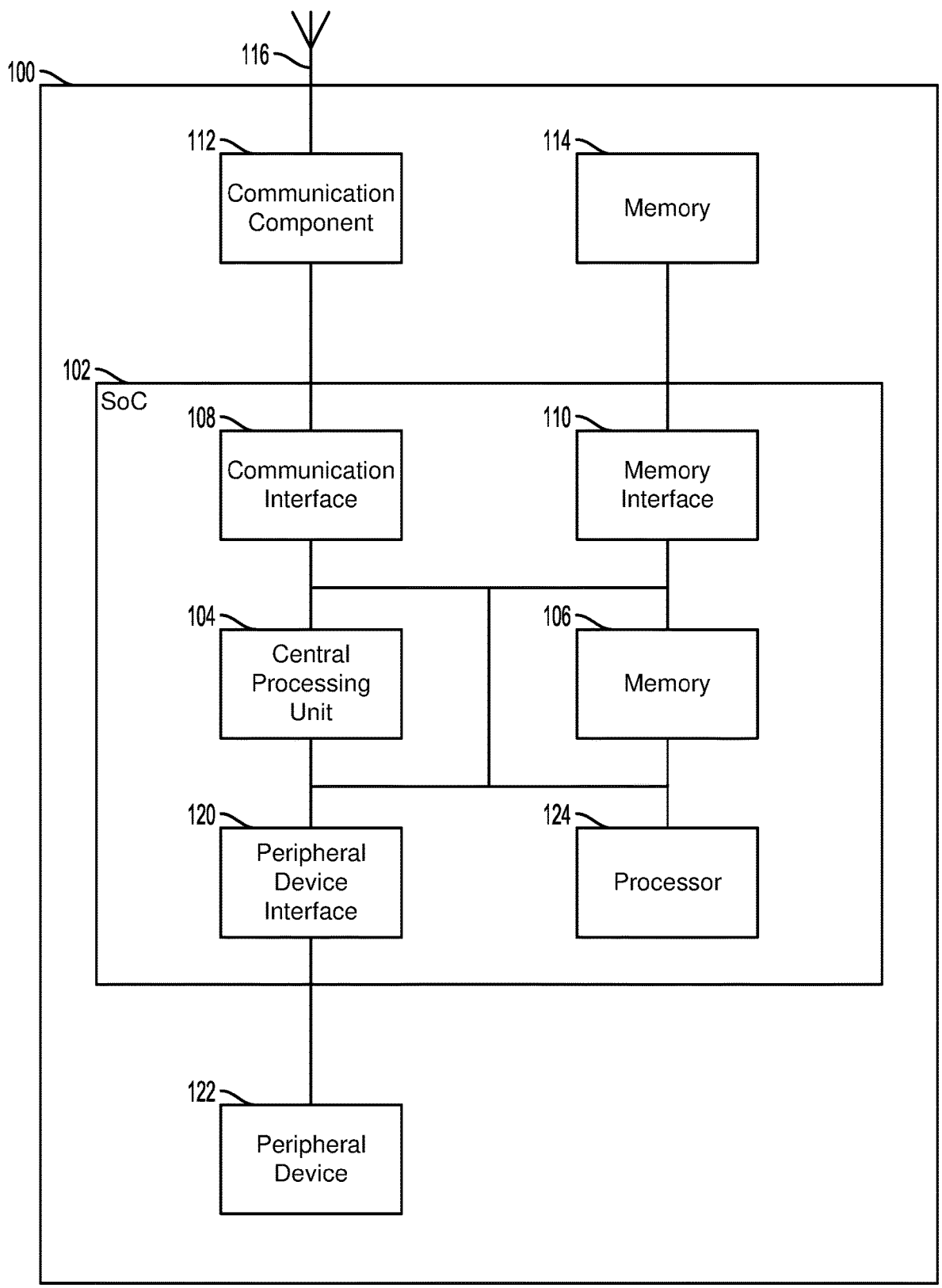
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of securing an execution environment. Various embodiments may include a software development toolchain for generating binary executable files for software for which hashes of functions are generated to validate the functions of binary executable files at runtime. In some embodiments, the hashes are generated for each function of the binary executable files, stored to a designated memory, and encrypted. Embodiments may also include hardware for validating the functions of the binary executable files at runtime. In some embodiments, the hardware may generate hashes of functions executed at runtime and compare the hashes generated at runtime with the hashes of the functions of the binary executable files stored in the dedicated memory to validate the functions executed at runtime.

The term "computing device" may refer to stationary computing devices including personal computers, desktop computers, all-in-one computers, workstations, super computers, mainframe computers, embedded computers (such as in vehicles and other larger systems), computer systems in vehicles, servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of code, e.g., processor-executable instructions, for ease and clarity of explanation, but may be similarly applicable to any data, e.g., code, program data, or other information stored in memory. The terms "code", "data", and "information" are used interchangeably herein and are not intended to limit the scope of the claims and descriptions to the types of code, data, or information used as examples in describing various embodiments.

Current secure execution environments rely on presumed isolation of code execution from vulnerable attack vectors and/or previously validated code for security for executing code. However, such secure execution environments lack support to validate execution of code during runtime, and thus, are not able to detect attacks such as session hijacking via injecting malicious code (e.g., via network packets), probing and replacing a stack frame during runtime, and replacing DLLs during runtime.

Various embodiments provide solutions to the foregoing concerns, enabling runtime validation of functions executing in a processor, which may be used for detection of session hijacking so that action may be taken to prevent adverse effects of the attack. Various embodiments include a software development toolchain that may generate hashes for each function of a software code as part of generating a binary executable (e.g., ELF, PE, Mach-O, etc.) of the software. Embodiments further include processor hardware configured to generate hashes, at runtime, for functions executed in the processor, and to validate the functions, at runtime, by comparing the hashes generated by the software development toolchain with the hashes generated using the processor hardware.

The software development toolchain, which may include a compiler, an assembler, and a linker, identify each function of the software code, generate a hash for each function, and insert hashing instructions in each function that may trigger generating the hashes for each function. Generating the hashes of each function may include hashing all the instructions of each function. The hashes of each function may be generated using hash functions provided to the software development toolchain by a developer. The hash functions may be stored in a hash dedicated memory.

The software development toolchain may encrypt the hashes for each function and store the encrypted hashes to the hash dedicated memory. Encrypting the hashes may be implemented using a private key provided to the software development toolchain by the developer, and encryption functions preconfigured in the processor hardware and/or provided to the software development toolchain by the developer. An encryption scheme for encrypting the hashes may be symmetric and/or asymmetric. The hash dedicated memory may include any memory accessible to the processor, including memory accessible only by the processor, such as a dedicated partition of a memory and/or a processor hardware-only accessible memory. Access to the hash dedicated memory from a software may result in generation of an exception.

For example using an asymmetric encryption scheme, the developer may store a public key for decrypting the dedicated memory to the processor hardware. The hashing instructions may indicate a start of a function and trigger generation of a hash for the function at runtime and may indicate an end of the function and cease generation of the hash for the function at runtime. The hashing instructions may be included in the binary executable of the software.

At run time, the processor hardware for validating the functions of the software code executed in the processor may encounter the hashing instructions for the executed functions in the binary executable of the software. The hashing instructions that may trigger the processor hardware to generate the hashes for each executed function in a manner similar to the toolchain. Generating the hashes of each executed function may include hashing all the instructions of each executed function. The hashes of each executed function may be generated using hash functions preconfigured in the processor hardware by a manufacturer of the processor and/or by a developer, such as the hash functions stored in the hash dedicated memory. The processor hardware may decrypt the hashes of the functions of the software code from the hash dedicated memory and retrieve the decrypted hashes from the hash dedicated memory. At runtime, the processor hardware may validate the executed functions by comparing the hashes generated for the executed functions at runtime with the decrypted hashes for the functions of the software retrieved from the hash dedicated memory. Execution of the software code may be permitted to continue using results of valid executed functions. Invalid executed functions may trigger the processor hardware to issue an exception.

Various embodiments are described in terms of hashing and hashes of instructions of a function as a nonlimiting example for clarity and ease of explanation. One skilled in the art would understand that other means of generating representation of and representing instructions of a function may be implemented, such as other algorithmic means.

Various embodiments enable processor hardware to quickly validate functions before they are executed at runtime, thereby improving the functioning and security of software executing on processors of computing devices.

FIG. 1 illustrates a system including a computing device 100 suitable for use with various embodiments. The computing device 100 may include an SoC 102 with a central processing unit 104, a memory 106, a communication interface 108, a memory interface 110, a peripheral device interface 120, and a processing device 124. The computing device 100 may further include a communication component 112, such as a wired or wireless modem, a memory 114, an antenna 116 for establishing a wireless communication link, and/or a peripheral device 122. The processor 124 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 124 and/or processor cores, such as a general purpose processor, a central processing unit (CPU) 104, a digital signal processor (DSP), a graphics processing unit (GPU), an accelerated processing unit (APU), a secure processing unit (SPU), an intellectual property unit (IPU), a subsystem processor of specific components of the computing device, such as an image processor for a camera subsystem or a display processor for a display, an auxiliary processor, a peripheral device processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more CPUs 104 and processors 124. The computing device 100 may include more than one SoC 102, thereby increasing the number of CPUs 104, processors 124, and processor cores. The computing device 100 may also include CPUs 104 and processors 124 that are not associated with an SoC 102. Individual CPUs 104 and processors 124 may be multicore processors. The CPUs 104 and processors 124 may each be configured for specific purposes that may be the same as or different from other CPUs 104 and processors 124 of the computing device 100. One or more of the CPUs 104, processors 124, and processor cores of the same or different configurations may be grouped together. A group of CPUs 104, processors 124, or processor cores may be referred to as a multiprocessor cluster.

The memory 106 of the SoC 102 may be a volatile or non-volatile memory configured for storing data and processor-executable code for access by the CPU 104, the processor 124, or other components of SoC 102. The computing device 100 and/or SoC 102 may include one or more memories 106 configured for various purposes. One or more memories 106 may include volatile memories such as random-access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the CPU 104 and/or processor 124 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the CPU 104, the processor 124, or other components of SoC 102. The data or processor-executable code loaded to the memory 106 may be loaded in response to execution of a function by the CPU 104, the processor 124, or other components of SoC 102. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or nonvolatile storage medium, and retrieve data and processor-executable code from the volatile and/or non-volatile storage medium. The memory 114 may be configured much like an embodiment of the memory 106 in which the memory 114 may store the data or processor-executable code for access by one or more of the CPU 104, the processor 124, or other components of SoC 102. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the CPU 104, the processor 124, or other components of the SoC 12 to read data from and write data to the memory 114.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
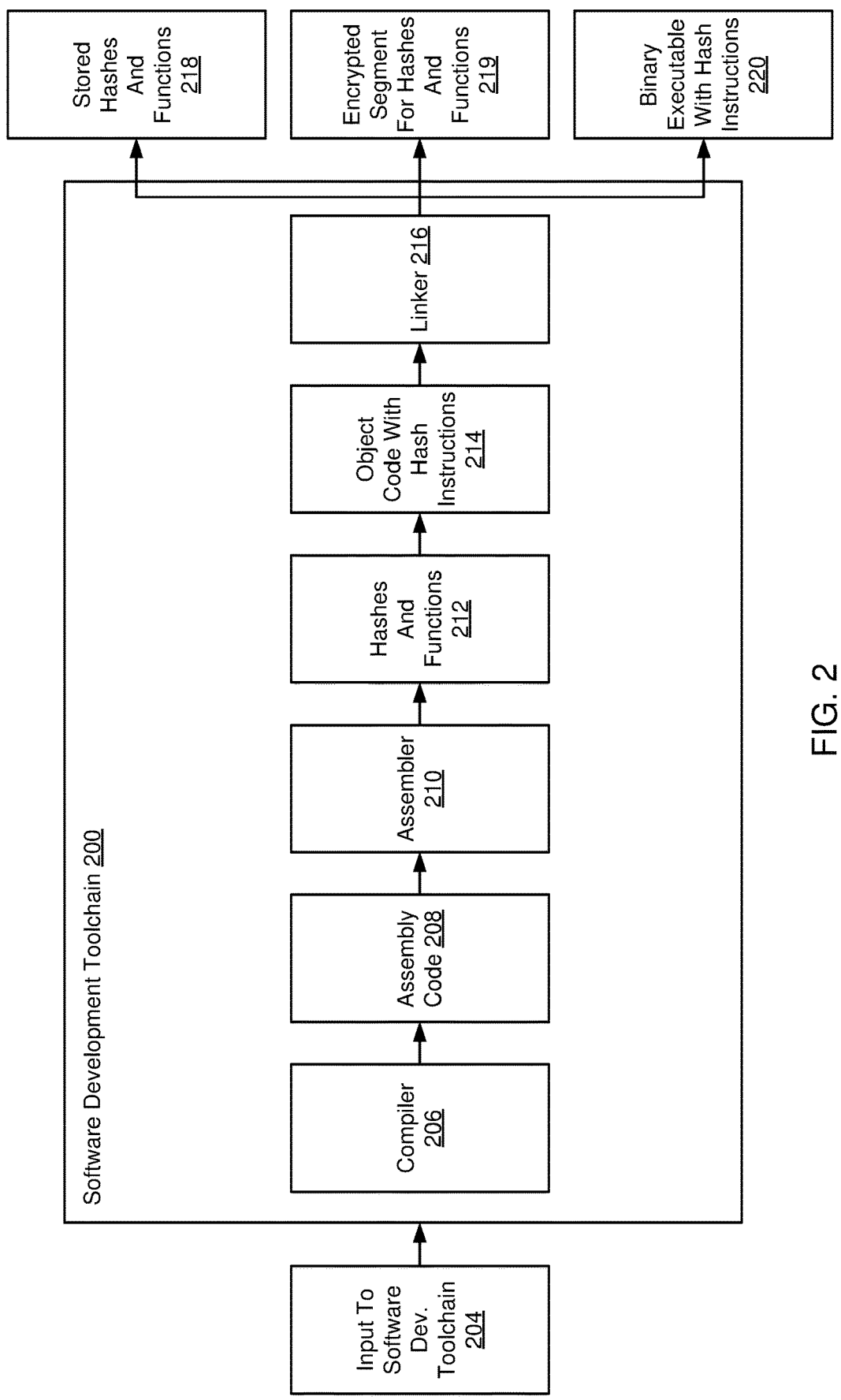
FIG. 2 is a block and flow diagram illustrating an example of a software development toolchain for generating a binary executable file for execution in a secure execution environment for implementing various embodiments.

FIG. 2 illustrates an example of a software development toolchain for generating a binary executable file for execution in a secure execution environment for implementing various embodiments. With reference to FIGS. 1 and 2, a software development toolchain 200 may be implemented in a processor (e.g., CPU 104, processor 124), and may include a compiler 206, an assembler 210, and a linker 216. The software development toolchain 200 may be used by a developer of a processor (e.g., CPU 104, processor 124) and/or for a computing device (e.g., computing device 100) having the processor configured to implement a secure execution environment to execute software developed using the software development toolchain 200.

The software development toolchain 200 may receive inputs 204 for use in generating a binary executable with hash instructions 220, and generating, encrypting, and storing hashes for functions of a software, such as encrypted hashes and functions 218. The inputs 204 may include software source code to be converted to a binary executable and a command to compile the software source code. In some embodiments, the inputs 204 may also include an indication of a hashing algorithm for using in generating hashes for the functions of the software. In further examples, the inputs 204 may include a private key and/or indication of an encryption algorithm for using in encrypting the hashes for the functions of the software.

The compiler 206 may receive the software source code of the inputs 204 to the software development toolchain 200 and generate an assembly code 208 of the source code. In some embodiments, the compiler 206 may also receive the indication of the hashing algorithm, the private key, and/or the indication of an encryption algorithm of the inputs 204. The compiler 206 may provide the one or more of the inputs to one or more of the components of the software development toolchain 200. For example, the compiler 206 may provide the indication of a hashing algorithm to the assembler 210. As another example, the compiler 206 may provide the private key and/or the indication of the encryption algorithm to the linker 216.

Figure 3:
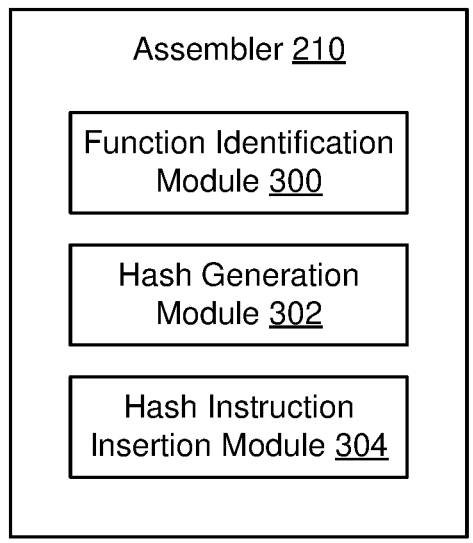
FIG. 3 is a block diagram illustrating an example of an assembler for implementing various embodiments.

The assembler 210 may receive the assembly code 208 and the indication of the hashing algorithm and generate data of hashes and functions 212 and object code with hash instructions 214. The assembler 210 may also generate a program header, or a segment, for the data of hashes and functions 212, which may be part of the object code with hash instructions 214. FIG. 3 illustrates an example of the assembler 210. With reference to FIGS. 1-3, the assembler 210 may include a function identification module 300, a hash generation module 302, and a hash instruction insertion module 304, which may be implemented as part of the assembler 210 to generate the data of hashes and functions 212 and the object code with hash instructions 214.

The function identification module 300 may be implemented using any of various known methods for identifying different functions of the software in the assembly code 208. For example, the function identification module 300 may identify functions between a prologue and an epilogue of the functions in the assembly code 208. In a specific and non-limiting example, the function identification module 300 may identify functions between push instructions of the prologues and pop instructions of the epilogues, for managing data of a stack.

The hash generation module 302 may generate the data of hashes and functions 212 for the assembler 210. For example, the hash generation module 302 may use the indication of the hashing algorithm received by the assembler 210 to determine a hashing algorithm that the assembler 210 will use to generate the data of hashes and functions 212. In some embodiments, the indication of the hashing algorithm may indicate a hashing algorithm preconfigured on the processor. The indication of the hashing algorithm may be a direct and/or indirect reference to the hashing algorithm in a memory (e.g., memory 106), and the hash generation module 302 may retrieve the hashing algorithm from the memory based on the indication of the hashing algorithm. In some embodiments, the indication of the hashing algorithm may itself be a hashing algorithm that the hash generation module 302 can execute. The hashing algorithm may be stored to a memory (e.g., memory 106 in FIG. 1), such as in a hash dedicated memory.

The hash generation module 302 may generate a hash for each instruction of each function of the software in the assembly code 208. In some embodiments, the hash for each instruction of each function of the software may include a hash of a push instruction following the instructions of the function. The hash generation module 302 may further associate the hash for each instruction with the function to which it belongs. For example, each function may have a function identifier, which may include any means for uniquely identifying each function of the software, such as an address of the function. The hash generation module 302 may generate the data of hashes and functions 212 such that the hash for each instruction is associated with the appropriate function identifier. The association may be based on format and or structure of the data of hashes and functions 212.

The hash instruction insertion module 304 may generate the object code with hash instructions 214 for the assembler 210. For example, the hash instruction insertion module 304 may insert hash instructions into the object code of the software. The hash instructions may include a start hash instruction and a stop hash instruction, which may cause the processor of the computing device executing a function to start and stop generating hashes of the instructions of the executing function at runtime. The stop hash instruction may also cause the processor to compare the hashes for the instructions of the function generated using the software development toolchain 200, such as the hashes and functions 212. The stop hash function may also cause the processor to generate an exception in response to the comparison of the hashes resulting in a mismatch of hashes. A start hash instruction may be inserted before the instructions of a function and a stop hash instruction may be inserted after the instructions of the function in the object code. For example, the start hash instruction may be inserted into the prologue of the function and the stop hash instruction may be inserted into the epilogue of the function. For a specific and non-limiting example, the start hash instruction may be inserted before a push instruction and the stop hash instruction may be inserted before a pop instruction.

Figure 4:
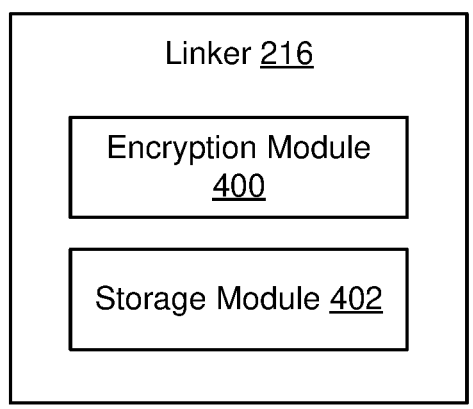
FIG. 4 is a block diagram illustrating an example of a linker for implementing various embodiments.

Referring again to FIG. 2, the linker 216 may receive the data of hashes and functions 212 and the object code with hash instructions 214, encrypt the program header, or the segment, for the data of hashes and functions 212, store the hashes and functions 218 and the encrypted program header, or the segment, for the data of hashes and functions 219 in the hash dedicated memory, and generate a binary executable with hash instructions 220 from the object code with hash instructions 214. In some embodiments, the linker 216 may receive the private key and/or the indication of the encryption algorithm and use the private key and/or the indication of the encryption algorithm in encrypting the program header, or the segment, for the hashes and functions 212. FIG. 4 illustrates an example of the linker 216. With reference to FIGS. 1-4, the linker 216 may include an encryption module 400 and a storage module 402, which may be implemented as part of the linker 216 to encrypt the program header, or the segment, for the hashes and functions 212 and store the store the hashes and functions 218 and the encrypted program header, or the segment, for the data of hashes and functions 219 in the hash dedicated memory.

The encryption module 400 may encrypt the program header, or the segment, for hashes and functions 212, generating the encrypted program header, or the segment, for hashes and functions 219. The encryption module 400 may use the private key received by the linker 216 in conjunction with an encryption algorithm to encrypt the program header, or the segment, for the hashes and functions 212. For example, the encryption module 400 may use the indication of the encryption algorithm received by the linker 216 to determine the encryption algorithm that the linker 216 can use to encrypt the program header, or the segment, for hashes and functions 212. In some embodiments, the indication of the encryption algorithm may indicate an encryption algorithm preconfigured on the processor. The indication of the encryption algorithm may be a direct and/or indirect reference to the encryption algorithm in a memory (e.g., memory 106), and the encryption module 400 may retrieve the encryption algorithm from the memory based on the indication of the encryption algorithm. In some embodiments, the indication of the encryption algorithm may itself be an encryption algorithm that the encryption module 400 can execute.

The storage module 402 may store the hashes and functions 218 and the encrypted program header, or the segment, for the data of hashes and functions 219 in a memory (e.g., memory 106 in FIG. 1), such as the hash dedicated memory. The memory may be any memory accessible by the processor of the computing device. In some embodiments, the memory may be memory accessible only to hardware of the computing devices, such as hardware of the processor for implementing the secure execution environment.

Referring again to FIG. 2, the linker 216 may generate the binary executable with hash instructions 220 from the object code with hash instructions 214 using various known methods. The linker 216 may generate a binary executable using known methods, with the addition that the object code from which the linker 216 generates the binary executable includes the hash instructions, and therefore, the binary executable also includes the hash instructions.

Figure 5:
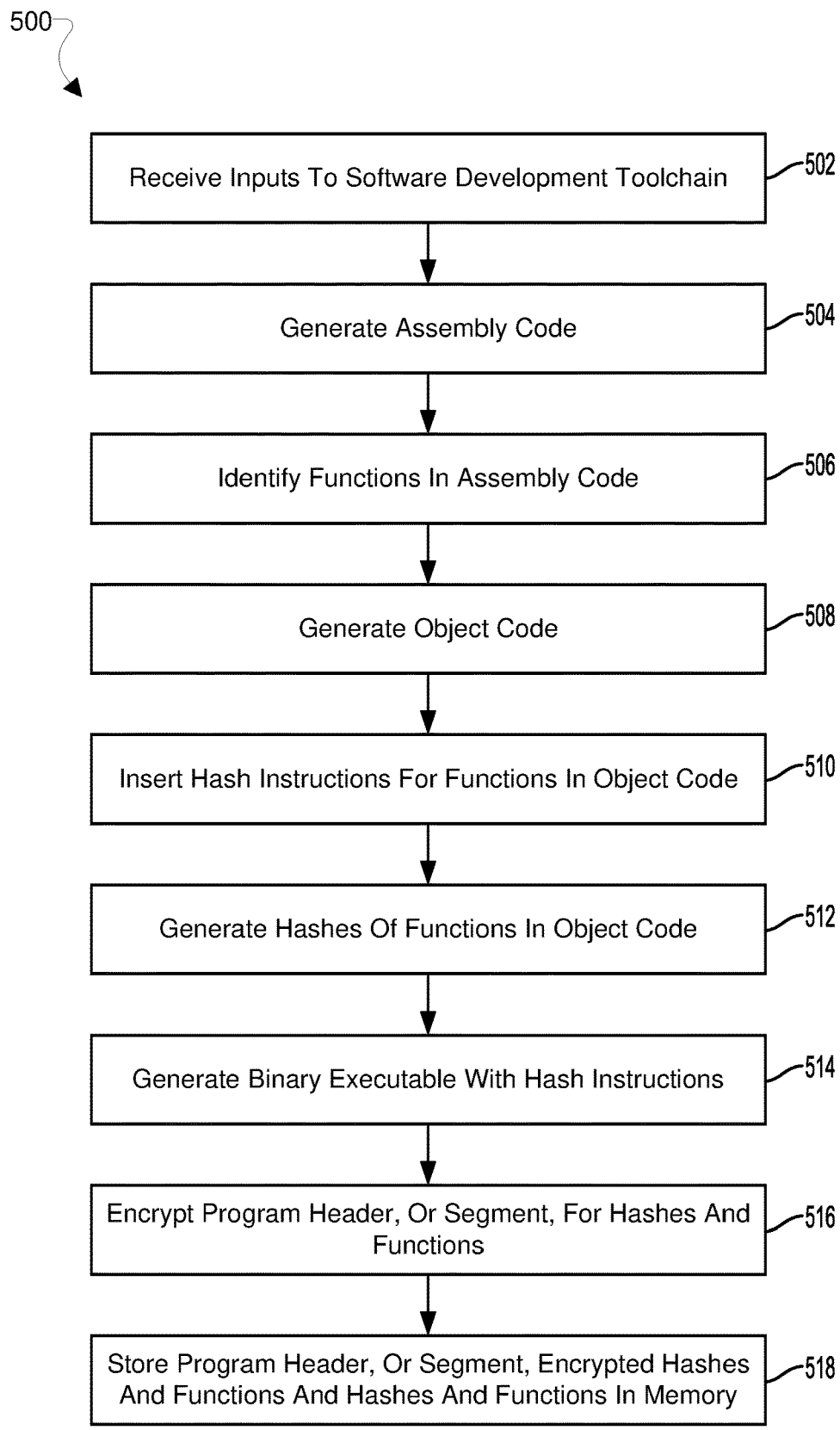
FIG. 5 is a process flow diagram illustrating a method performed in a computing device for generating a binary executable file for execution in a secure execution environment according to an embodiment.

FIG. 5 illustrates a method 500 that may be implemented in a computing device performing operations of a software development toolchain including the compiler, assembler and linker functions for generating a binary executable file for execution in a secure execution environment according to some embodiments. With reference to FIGS. 1-5, the method 500 may be performed in a computing device (e.g., computing device 100), in hardware of a computing device, in software executing in a processor of the computing device, or in a combination of a software-configured processor and dedicated hardware. For example, the method 500 may be performed in a CPU 104 or processor 124 executing a software development toolchain 200 that includes a compiler 206, an assembler 210, a linker 216, a function identification module 300, a hash generation module 302, hash instruction insertion module 304, linker 216, encryption module 400, storage module 402. The method 500 may further be performed in whole or in part in other individual components, such as various memories/caches (e.g., memory 106, 114) and various memory/cache controllers. In order to encompass the alternative configurations of hardware and software that may perform the method 500 in various embodiments, the hardware implementing the method 500 is referred to herein as a "processing device" that may be configured with processor executable instructions (software) that may be stored in a non-transitory, processor readable medium (e.g., memory 106, 114).

In block 502, the processing device may receive inputs (e.g., inputs 204 in FIG. 2) to a software development toolchain (e.g., software development toolchain 200 in FIG. 2). The processing device may use the inputs in generating a binary executable with hash instructions (e.g., binary executable with hash instructions 220 in FIG. 2), and generating, encrypting, and storing encrypted hashes and functions (e.g., encrypted hashes and functions 218 in FIG. 2) of a software. The inputs may include software source code to be converted to a binary executable. In some embodiments, the inputs may also include an indication of a hashing algorithm for using in generating hashes for the functions of the software. In some embodiments, the inputs may include a private key and/or indication of an encryption algorithm for using in encrypting the hashes for the functions of the software. In some embodiments, the processing device receiving the inputs to the software development toolchain in block 502 may be a processor (e.g., CPU 104, processor 124), the software development toolchain, and/or a compiler (e.g., compiler 206 in FIG. 2).

In block 504, the processing device may generate assembly code from the source code. The processing device may generate the assembly code via various known methods, such as using the compiler to generate the assembly code from the source code. In some embodiments, the processing device generating the assembly code from the source code in block 504 may be the processor, the software development toolchain, and/or the compiler.

In block 506, the processing device may identify functions in the assembly code. The processing device may receive the assembly code generated in block 504. The processing device may identify different functions of the software in the assembly code using various known methods. For example, the processing device may identify functions between a prologue and an epilogue of the functions in the assembly code. In a specific and non-limiting example, the processing device may identify functions between push instructions of the prologues and pop instructions of the epilogues, for managing data of a stack. In some embodiments, the processing device identifying the functions in the assembly code in block 506 may be the processor, the software development toolchain, an assembler (e.g., assembler 210 in FIGS. 2 and 3), and/or a function identification module (e.g., a function identification module 300).

In block 508, the processing device may generate object code from the assembly code. The processing device may generate the object code using various known methods, such as using the assembler to generate the object code from the assembly code. In some embodiments, the processing device generating the object code from the assembly code in block 508 may be the processor, the software development toolchain, and/or the assembler.

In block 510, the processing device may insert hash instructions in each function in the object code. The processing device may generate object code with hash instructions (e.g., object code with hash instructions 214 in FIG. 2) by inserting hash instructions in each function in the object code. The hash instructions may include a start hash instruction and a stop hash instruction, which may cause a processor (e.g., CPU 104, processor 124) of a computing device (e.g., computing device 100) executing a function to start and stop generating hashes of the instructions of the executing function at runtime. A start hash instruction may be inserted before the instructions of a function and a stop hash instruction may be inserted after the instructions of the function in the object code. For example, the start hash instruction may be inserted into the prologue of the function and the stop hash instruction may be inserted into the epilogue of the function. For a specific and non-limiting example, the start hash instruction may be inserted before a push instruction and the stop hash instruction may be inserted before a pop instruction. In some embodiments, inserting the hash instructions in each function in the object code in block 510 may be implemented following and/or concurrently with generating the object code from the assembly code in block 508. In some embodiments, the processing device inserting the hash instructions in each function in the object code in block 510 may be the processor, the software development toolchain, the assembler, and/or a hash instruction insertion module (e.g., hash instruction insertion module 304).

In block 512, the processing device may generate hashes (e.g., data of hashes and functions 212 in FIG. 2) of functions in the object code. The processing device may implement a hashing function to generate hashes of each instruction of a function identified in block 508. For example, the hash generation module 302 may use the indication of the hashing algorithm of the inputs to determine a hashing algorithm to use to generate the hashes. In some embodiments, the indication of the hashing algorithm may indicate a hashing algorithm preconfigured on the processing device. The indication of the hashing algorithm may be a direct and/or indirect reference to the hashing algorithm in a memory (e.g., memory 106), such as a hash dedicated memory, and the processing device may retrieve the hashing algorithm from the memory based on the indication of the hashing algorithm. The start hash instruction may trigger generating the hashes for any function, and the stop hash instruction inserted into the function may terminate generation of a hash. In some embodiments, the indication of the hashing algorithm may itself be a hashing algorithm that the processing device can execute. In some embodiments, the hash for each instruction of each function of the software may include a hash of a push instruction following the instructions of the function.

The processing device may further associate the hash for each instruction with the function to which it belongs. For example, each function may have a function identifier, which may include any means for uniquely identifying each function of the software, such as an address of the function. The processing device may generate the hashes in association with the function identifiers for the functions from which the hashes were generated. The association may be based on format and or structure of the data of hashes and function identifiers. In some embodiments, generating the hashes of the functions in the object code in block 510 may be implemented following and/or concurrently with generating the object code from the assembly code in block 508. In some embodiments, the processing device generating the hashes of the functions in the object code in block 510 may be the processor, the software development toolchain, the assembler, and/or a hash generation module (e.g., hash generation module 302).

In block 514, the processing device may generate a binary executable with hash instructions (e.g., binary executable with hash instructions 220 in FIG. 2). The processing device may generate the binary executable with hash instructions from the object code with hash instructions using various known methods. The processing device may generate a binary executable using known methods, with the addition that the object code from which the processing device generates the binary executable includes the hash instructions, and therefore, the binary executable also includes the hash instructions. In some embodiments, the processing device generating the binary executable with hash instructions in block 514 may be the processor, the software development toolchain, and/or a linker (e.g., linker 216 in FIGS. 2 and 4).

In block 516, the processing device may encrypt a program header, or segment, for the hashes and function (e.g., program header, or segment, for hashes and functions 212 in FIG. 2). The processing device may encrypt the program header, or segment, for hashes and functions, generating encrypted program header, or segment, for hashes and functions (e.g., encrypted program header, or segment, for hashes and functions 219 in FIG. 2). The processing device may use the private key of the inputs in conjunction with an encryption algorithm to encrypt the data of hashes and functions. For example, the processing device may use the indication of the encryption algorithm of the inputs to determine the encryption algorithm to use to encrypt the data of hashes and functions. In some embodiments, the indication of the encryption algorithm may indicate an encryption algorithm preconfigured on the processor. The indication of the encryption algorithm may be a direct and/or indirect reference to the encryption algorithm in a memory (e.g., memory 106), and the processing device may retrieve the encryption algorithm from the memory based on the indication of the encryption algorithm. In some embodiments, the indication of the encryption algorithm may itself be an encryption algorithm that the processing device can execute. In some embodiments, the processing device encrypting the program header, or segment, for the hashes and function in block 516 may be the processor, the software development toolchain, the linker, and/or an encryption module (e.g., encryption module 400).

In block 518, the processing device may store the encrypted program header, or segment, for hashes and functions and the hashes and functions (e.g., hashes and functions 212 in FIG. 2). The processing device may store the encrypted program header, or segment, for hashes and functions and the hashes and functions in a hash dedicated memory (e.g., memory 106). The memory may be any memory accessible by the processing device. In some embodiments, the memory may be memory accessible only to processing the device. In some embodiments, the processing device storing the encrypted program header, or segment, for the hashes and functions and the hashes and functions in block 518 may be the processor, the software development toolchain, the linker, and/or a storage module (e.g., storage module 402).

Figure 6:
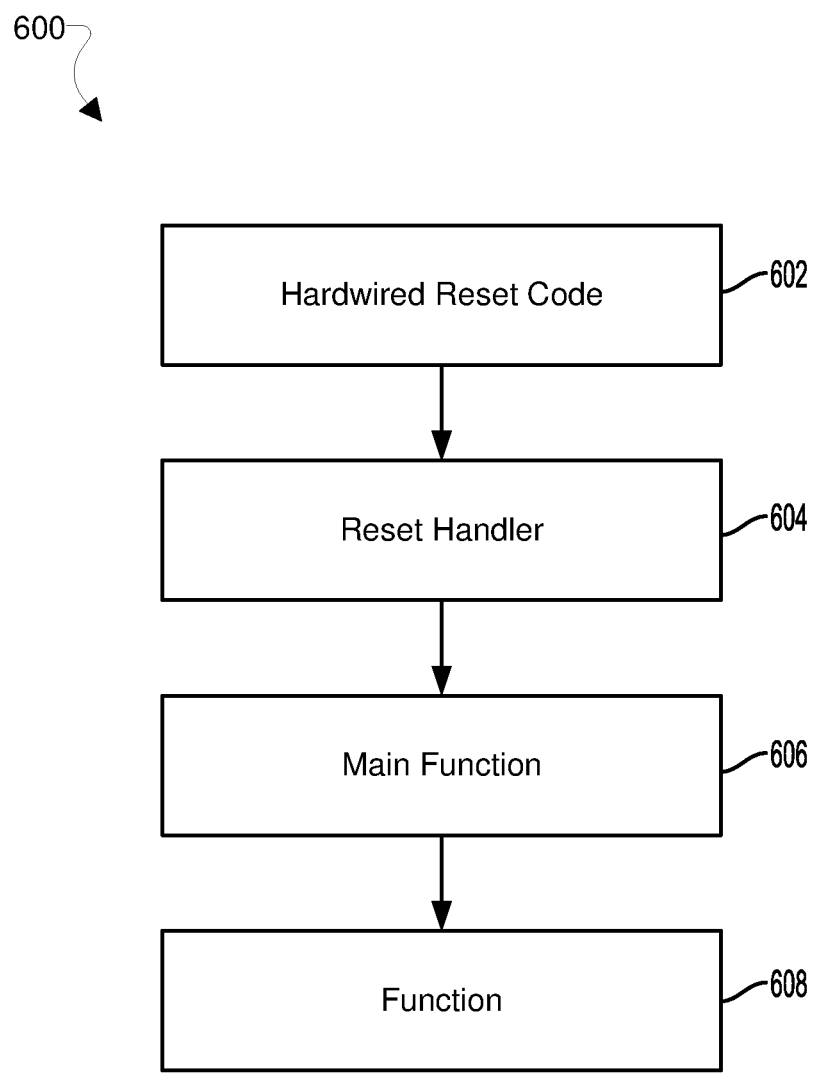
FIG. 6 is a block and flow diagram illustrating an example of boot components for implementing a secure execution environment for implementing various embodiments.

FIG. 6 illustrates an example of boot components for implementing a secure execution environment for implementing various embodiments. With reference to FIGS. 1-6, a computing device (e.g., computing device 100) may implement the boot components 600 in a processor (e.g., CPU 104, processor 124). The boot components 600 may include a hardwired reset code 602, a reset handler 604, a main function 606, and a function 608. The boot components 600 may be implemented in hardware, firmware, and/or software, and may be implemented in a boot, or reset, sequence for the computing device. The boot components may be embedded in hardware and/or stored and access from a memory (e.g., memory 106, 114).

The hardwired reset code 602 may be configured to cause a processor to determine whether to implement a secure execution environment, and if so, to initialize the secure execution environment. In some embodiments, the hardwired reset code 602 may be implemented as microcode on the processor and stored in a memory that read-only memory. For example, the hardwired reset code 602 may check a state of an eFuse to determine whether to implement the secure execution environment. The state of the eFuse may indicate to the hardwired reset code 602 whether the secure execution environment is an enabled feature for the processor. In response to the state of the eFuse indicating that the secure execution environment is an enabled feature for the processor, the hardwired reset code 602 may initialize the secure execution environment.

To initialize the secure execution environment, the hardwired reset code 602 may check whether an encrypted program header, or segment, for hashes and functions (e.g., encrypted program header, or segment, for hashes and functions 219 in FIG. 2) exist in a hash dedicated memory (e.g., memory 106) for a loaded binary executable (e.g., binary executable with hash instructions 220 in FIG. 2). The hash dedicated memory may be at a location in a memory and/or hardware only accessible memory known to the hardwired reset code 602 and may be checked for existence of data. The hash dedicated memory being populated with data may indicate to the hardwired reset code 602 the encrypted program header, or segment, for the hashes and functions exist in the hash dedicated memory for the loaded binary executable.

The hardwired reset code 602 may retrieve and decrypt the encrypted program header, or segment, for the hashes and functions and use the decrypted program header, or segment, for hashes and functions to retrieve the stored hashes and functions (e.g., stored hashes and functions 218 in FIG. 2) from the hash dedicated memory. The hardwired reset code 602 may store the hashes and functions to a secure execution environment dedicated memory (e.g., memory 106). The secure execution environment dedicated memory which may be a part of and/or all of a memory accessible by and/or hardware only accessible by hardware for implementing the secure execution environment.

With the secure execution environment initialized, the hardwired reset code 602 may handover control of the boot process to a reset vector, which may continue the boot process using various known methods, such as implementing the reset handler 604 that may include calling a main function 606. The main function 606 may include calls to a function 608.

The function 608 may be a function of the loaded binary executable, which may be generated using a software development toolchain (e.g., software development toolchain 200 in FIG. 2) for developing software for the processor configured to implement the secure execution environment.

The function 608 may include a start hash instruction prior to the instructions of the function 608 and a stop hash instruction following the instructions of the function 608. For example, the start hash instruction may be included in a prologue of the function 608, such as prior to a push instruction for pushing data to a stack. The start hash instruction may cause the processor executing the function 608 to start generating hashes of the instructions of the executing function 608 at runtime.

A stop hash instruction may be included in an epilogue of the function 608, such as prior to a pop instruction for removing data from the stack. The stop hash instruction may cause the processor executing the function 608 to stop generating hashes of the instructions of the executing function 608 at runtime. The stop hash instruction may cause the processor to stop generating hashes of the instructions following the pop instruction. In other words, a hash of the pop instruction may be generated using the start hash instruction.

The stop hash instruction may also cause the processor to compare the hashes of the function 608 that the processor generated at runtime with the hashes of the secure execution environment dedicated memory. The processor may retrieve the hashes that are associated with the executed function 608 from the secure execution environment dedicated memory and compare the generated hashes with the retrieved hashes at runtime to determine whether the hashes match. Matching hashes may indicate to the processor that the function 608 is unedited, and nonmatching hashes may indicate to the processor that the function 608 is edited, potentially maliciously.

Execution of an unedited function 608 may indicate that execution of the function 608 is secure and execution of an edited function 608 may indicate that execution of the function 608 is not secure. In response to an indication that execution of the function 608 is secure, the stop hash instruction may allow secure execution to proceed uninterrupted. In response to the indication that execution of the function 608 is not secure, the stop hash instruction may trigger generation of an exception indicating to the processor that the execution of the function 608 is not secure. The stop hash instruction may reset hardware of the processor implementing the start hash and/or stop hash instructions for a successive function 608.

Figure 7:
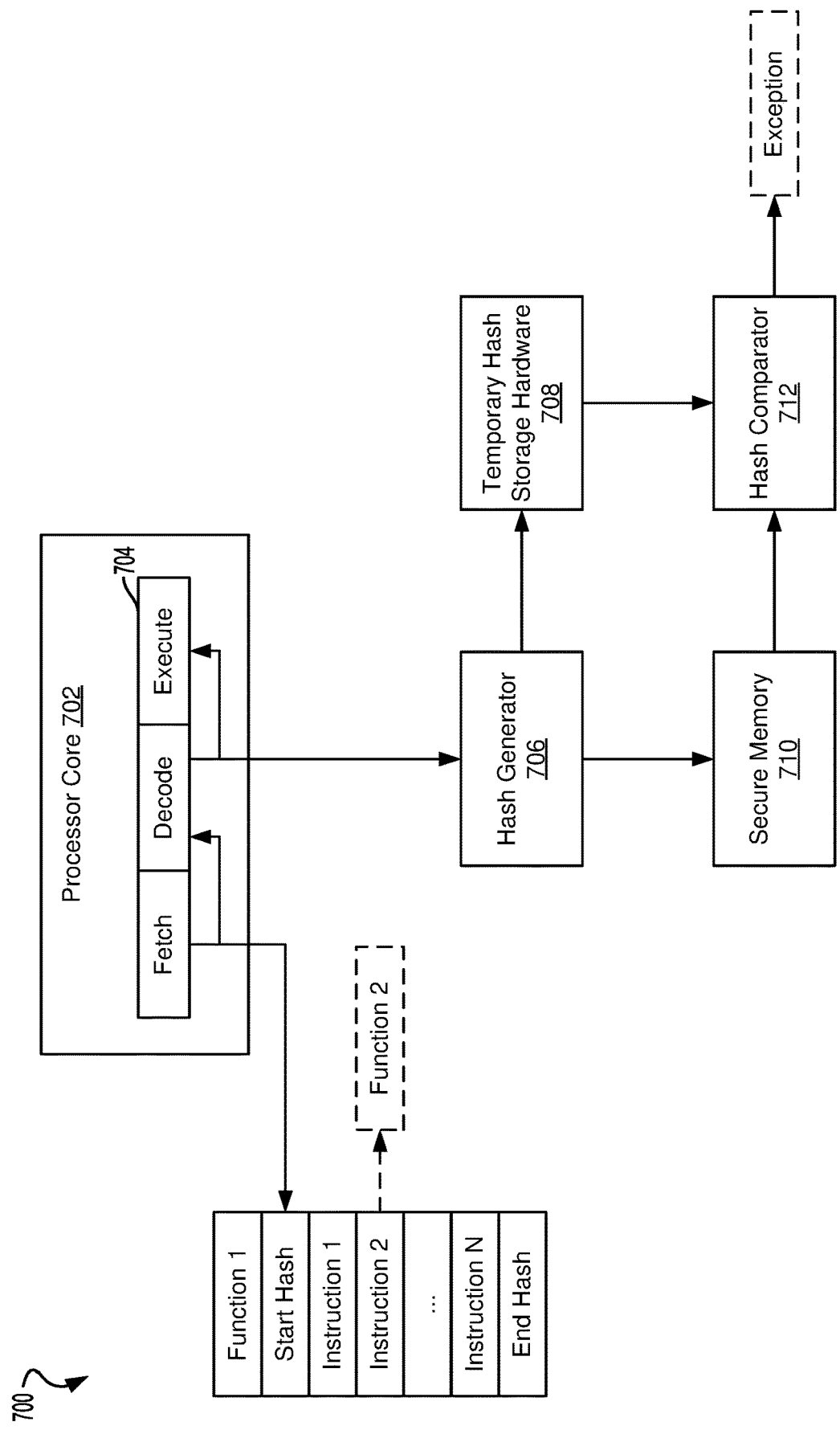
FIG. 7 is a block diagram illustrating an example of a secure execution environment for implementing various embodiments.

FIG. 7 illustrates an example of a secure execution environment for implementing various embodiments. With reference to FIGS. 1-7, a secure execution environment 700 may be implemented in hardware components of a processor (e.g., CPU 104, processor 124) and/or an SoC (e.g., SoC 102). The hardware components for implementing the secure execution environment 700 may include a processor core 702, hash generation hardware (referred to herein as a hash generator) 706, temporary hash storage hardware 708 (e.g., memory 106), secure execution environment dedicated memory 710 ("secure memory") (e.g., memory 106), and hash comparator hardware (referred to herein as a hash comparator) 712. The hash generator 706 and the hash comparator 712 may be implemented in secure hardware components coupled to or associated with the processor core 702.

The processor core 702 may execute a function ("function 1") (e.g., function 608). A pipeline 704 implemented in the processor core 702 may fetch instructions (e.g., "start hash," "instruction 1," "instruction 2," "instruction 3," "stop hash") from the function. The pipeline may decode the fetched instructions and may execute the decoded instructions and provide the decoded instructions to the hash generator 706 in parallel.

In parallel with the processor core 702 executing the instructions, the hardware components 706-712 may implement the start hash and stop hash instructions. The start hash instruction may cause the hash generator 706 to generate hashes of the instructions of the function in parallel with the execution of the instructions of the function. The hash generator 706 may use a hash algorithm preconfigured for the hash generator 706 and store the generated hashes to the temporary hash storage hardware 708. The temporary hash storage hardware 708 may include any memory accessible to the processor, including memory accessible only by the processor, such as a dedicated partition of a memory and/or a processor hardware only accessible memory. The temporary hash storage hardware 708 may include any memory accessible to the hash generator 706 and the hash comparator 712, including memory accessible only by the hash generator 706 and the hash comparator 712, such as a dedicated partition of a memory and/or a hardware only accessible memory.

The stop hash instruction may cause the hash generation hardware 706 to stop generating hashes of the instructions, and to retrieve hashes for the function from the secure execution environment dedicated memory 710 and provide the retrieved hashes to the hash comparator hardware 712 in parallel with the execution of the instructions of the function. The hash generation hardware 706 may use a function identifier retrieved by the processor core 702 from the function that the processor core 702 provides to the hash generator 706 to identify and retrieve hashes associated with the function identifier in the secure execution environment dedicated memory 710. In some embodiments, retrieving hashes for the function from the secure execution environment dedicated memory 710 and provide the retrieved hashes to the hash comparator 712 may involve prompting the secure execution environment dedicated memory 710 to provide the retrieved hashes to the hash comparator 712.

In response to population of the temporary hash storage hardware 708 with hashes and/or receiving the retrieved hashes from the hash generator 706, the hash comparator 712 may compare the hashes generated by the hash generator 706 for the function with the retrieved hashes for the function and determine whether the hashes match.

All matching hash results of the comparisons may be an indication that execution of the function is secure, and the hash comparator 712 may allow secure execution to proceed uninterrupted. Any nonmatching hash results of the comparisons may be an indication that execution of the function is not secure, and the hash comparator 712 may generate an exception indicating to the processor that the execution of the function is not secure. For example, rather than the hash expected for instruction 2, the processor core may fetch, decode, and execute function 2 as a result of unauthorized editing of a stack having function 1's instructions. The hash generator 706 may generate a hash of function 2 rather than instruction 2 and the hash comparator 712 may compare the generated hash of function 2 with the retrieved hash of instruction 2, the result of which may be nonmatching hashes that may cause the hash generator 706 to issue an exception. The stop hash instruction may cause a reset of the hash generation hardware 706, the temporary hash storage hardware 708, and the hash comparator 712 for a successive function.

Figure 8:
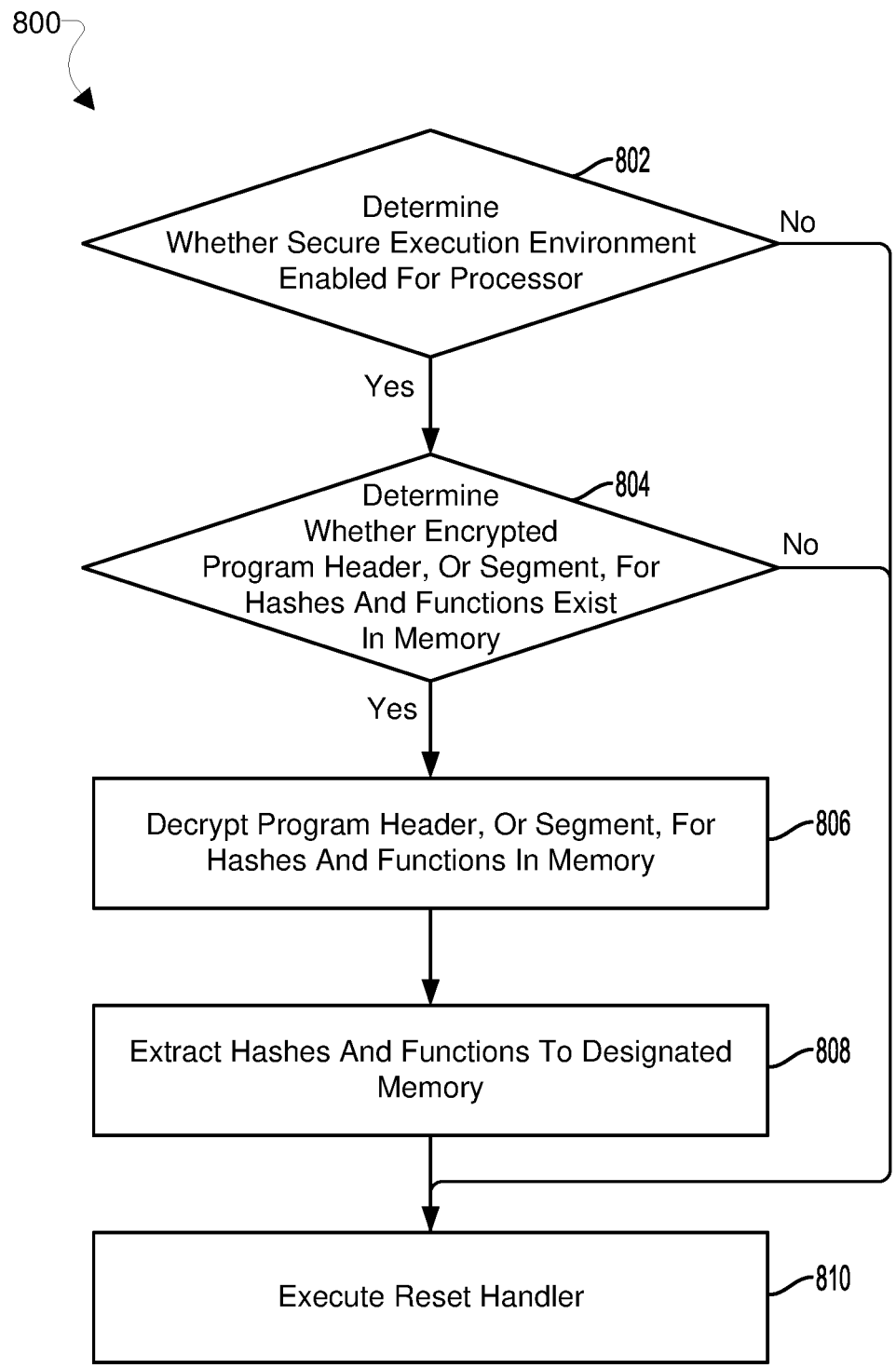
FIG. 8 is a process flow diagram illustrating a method for booting a processor for implementing a secure execution environment according to an embodiment.

FIG. 8 illustrates a method 800 that may be performed in a processing device of a computing device for booting a processor for implementing a secure execution environment according to some embodiments. The method 800 may be implemented in a computing device (e.g., computing device 100), in hardware (e.g., CPU 104, processor 124 in FIG. 1), in computer code executing in a processor (e.g., hardwired reset code 602, reset handler 604), or in a combination of a computer code-configured processor and dedicated hardware that includes other individual components, such as various memories/caches (e.g., memory 106, 114 in FIG. 1, secure execution environment dedicated memory 710) and various memory/cache controllers. In order to encompass the alternative configurations enabled in various embodiments, the hardware implementing the method 800 is referred to herein as a "processing device."

In determination block 802, the processing device may determine whether a secure execution environment (e.g., secure execution environment 700) is an enabled feature for a processor (e.g., CPU 104, processor 124 in FIG. 1, processor core 702). In some embodiments, the processing device may check a state of an eFuse (referred to herein as a "secure eFuse") to determine whether the secure execution environment feature is enabled for the processor. The state of the secure eFuse may indicate to the processing device whether the secure execution environment is an enabled feature for the processor. A blown secure eFuse may indicate to the processing device that the secure execution environment is an enabled feature for the processor. An intact secure eFuse may indicate to the processing device that the secure execution environment is not an enabled feature for the processor. In some embodiments, the processing device may check a value in an immutable memory (e.g., memory 106, 114), a value at a dedicated input pin, etc. configured to indicate to the processing device whether the secure execution environment is an enabled feature for the processor. In some embodiments, the processing device determining whether the secure execution environment is an enabled feature for the processor in determination block 802 may be a processor (e.g., CPU 104, processor 124 in FIG. 1, processor core 702) and/or a hardwired reset code (e.g., hardwired reset code 602).

In response to determining that the secure execution environment is an enabled feature for the processor (i.e., determination block 802="Yes"), the processing device may determine whether an encrypted program header, or segment, for hashes and functions (e.g., encrypted program header, or segment, for hashes and functions 219 in FIG. 2) exist in memory (e.g., memory 106) in determination block 804. The processing device may check whether the encrypted program header, or segment, for the hashes and functions exist in a hash dedicated memory (e.g., memory 106) for a loaded binary executable (e.g., binary executable with hash instructions 220 in FIG. 2). The hash dedicated memory may be at a location in a memory and/or hardware only accessible memory known to the processing device and may be checked for existence of data. The hash dedicated memory being populated with data may indicate to the processing device that the encrypted program header, or segment, for the hashes and functions exist in the hash dedicated memory for the loaded binary executable. In some embodiments, the processing device may check a value at a dedicated location in hash dedicated memory, a value at a dedicated input pin, etc. configured to indicate to the processing device whether encrypted hashes and functions exist in the hash dedicated memory for the loaded binary executable. In some embodiments, the processing device determining whether the encrypted program header, or segment, for the hashes and functions exist in memory in determination block 804 may be the processor and/or the hardwired reset code.

In response to determining that the encrypted hashes and functions exist in memory (i.e., determination block 804="Yes"), the processing device may decrypt the encrypted program header, or segment, for the hashes and functions in the memory in block 806. The processing device may be preconfigured with and use a public key and a decryption algorithm for use in decrypting the encrypted hashes and functions. In some embodiments, the processing device decrypting the encrypted program header, or segment, for the hashes and functions in the memory in block 806 may be the processor and/or the hardwired reset code.

In block 808, the processing device may extract hashes and functions (e.g., stored hashes and functions 218 in FIG. 2) to a memory (e.g., memory 106 in FIG. 1, secure execution environment dedicated memory 710) to temporarily store the hashes and functions. The memory may be a secure execution environment dedicated memory that may include any memory accessible to the processor, including memory accessible only by the processor, such as a dedicated partition of a memory and/or a processor hardware only accessible memory. The hashes and functions stored to the memory may include the hashes and a function identifier of the function for the hashes stored in association with each other. The association may be based on format and or structure of the data of hashes and function identifiers. In some embodiments, the processing device extracting the hashes and functions to the memory in block 808 may be the processor and/or the hardwired reset code.

In response to determining that the secure execution environment is not an enabled feature for the processor (i.e., determination block 802="No"), in response to determining that the encrypted program header, or segment, for the hashes and functions do not exist in memory; or following extracting the hashes and functions to the memory in block 808, the processing device may execute a reset handler (e.g., reset handler 604) in block 810. In some embodiments, the processing device executing the reset handler in block 810 may be the processor.

Figure 9:
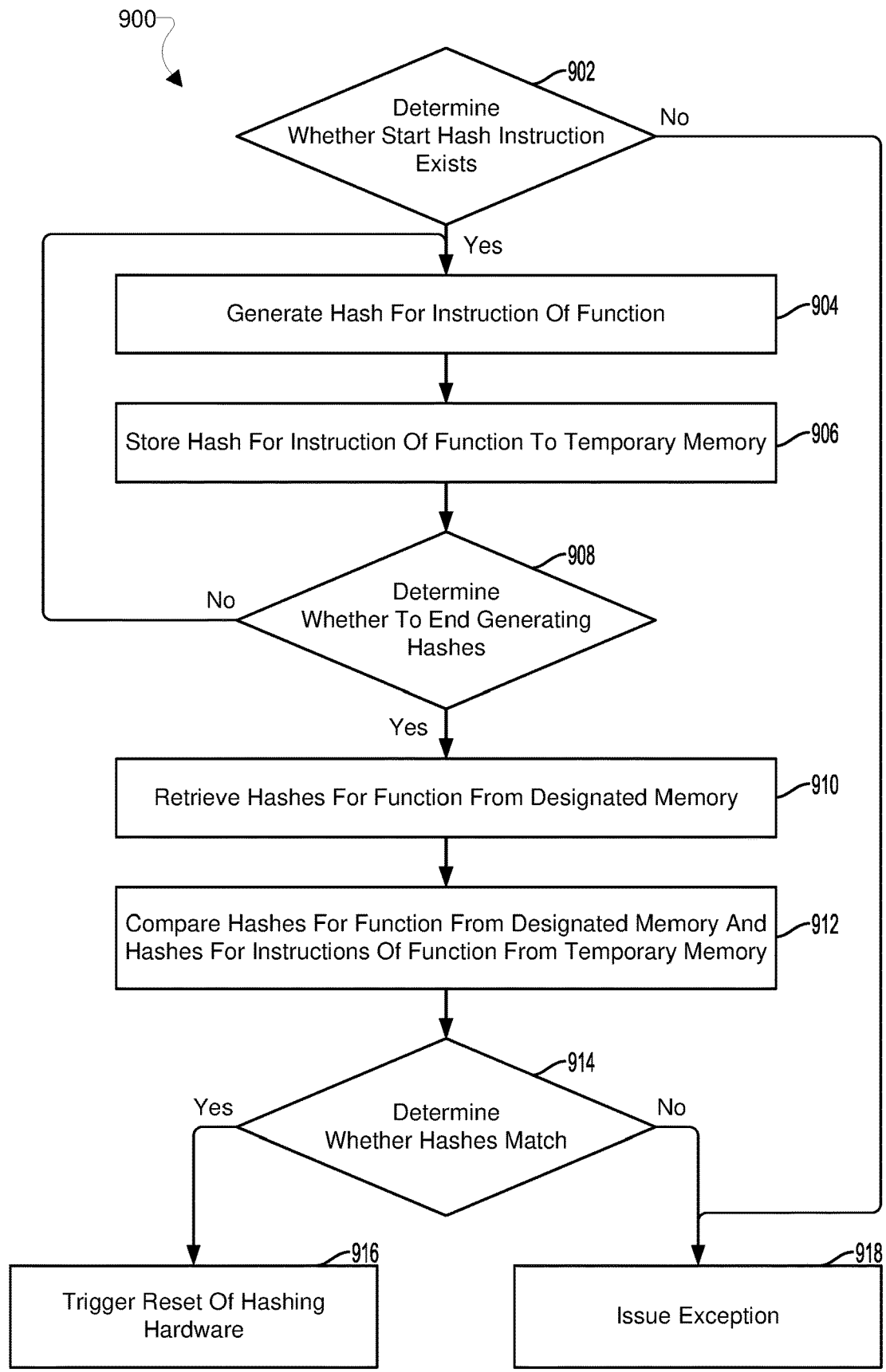
FIG. 9 is a process flow diagram illustrating a method for implementing a secure execution environment according to an embodiment.

FIG. 9 illustrates a method 900 that a processing device of a computing device may perform for booting a processor for implementing a secure execution environment according to an embodiment. The method 900 may be implemented in a computing device (e.g., computing device 100), in hardware (e.g., CPU 104, processor 124 in FIG. 1, processor core 702, hash generation hardware 706, temporary hash storage hardware 708, secure execution environment dedicated memory 710, hash comparator hardware 712), in computer code executing in a processor, or in a combination of a computer code-configured processor and dedicated hardware (e.g., a secure execution environment 700) that includes other individual components, such as various memories/caches (e.g., memory 106, 114 in FIG. 1, temporary hash storage hardware 708, secure execution environment dedicated memory 710) and various memory/cache controllers. In order to encompass the alternative configurations enabled in various embodiments, the hardware implementing the method 900 is referred to herein as a secure execution environment (SEE) device or "SEE device."

In determination block 902, the SEE device may determine whether a start hash instruction exists for a function (e.g., function 608) executing in a processor (e.g., CPU 104, processor 124 in FIG. 1, processor core 702). The SEE device may receive decoded instructions of the function executing in the processor. One such instruction, which may be the first instruction that the SEE device receives during processor execution of the function, may be a start hash instruction. In response to receiving the start hash instruction from the processor, the SEE device may determine that the start hash instruction exists for the function executing in the processor. In response to receiving instructions that do not include the start hash instructions, such as not receiving the start hash instruction as the first instruction or after a designated number of instructions, the SEE device may determine that the start hash instruction does not exist for the function executing in the processor. In some embodiments, the SEE device determining whether the start hash instruction exists for the function executing in a processor in determination block 902 may be a processor (e.g., CPU 104, processor 124 in FIG. 1, processor core 702) and/or a hash generation hardware (e.g., hash generation hardware 706).

In response to determining that the start hash instruction exists for the function executing in the processor (i.e., determination block 902="Yes"), the SEE device may generate hashes for the instructions of the function executing in the processor in block 904. The SEE device may receive, from the processor, an instruction for execution in the processor while executing the function. The SEE device may be preconfigured with a hash algorithm that may be used to generate a hash for the received instruction of the function executing in the processor. In some embodiments, the SEE device generating the hashes for the instructions of the function executing in the processor in block 904 may be the processor and/or the hash generation hardware.

In block 906, the SEE device may store the hashes for the instructions of the function executing in the processor to a temporary memory (e.g., memory 106 in FIG. 1, temporary hash storage hardware 708). The temporary memory may include any memory accessible to the processor, including memory accessible only by the processor, such as a dedicated partition of a memory and/or a processor hardware only accessible memory. The hashes may be stored in any organization that is known to the SEE device for use in comparison with other hashes as described further herein. For example, the hashes may be stored in order in which or reverse order of which the hashes are generated, in ascending or descending value, etc. In some embodiments, the SEE device storing the hashes for the instructions of the function executing in the processor to the temporary memory in block 906 may be the processor, the hash generation hardware, and/or a temporary hash storage hardware (e.g., temporary hash storage hardware 708).

In determination block 908, the SEE device may determine whether to end generating the hashes for the instructions of the function executing in the processor. The function may include a stop hash instruction, and the SEE device may receive the stop hash function from the processor reaching the stop hash instruction during execution of the function. The stop hash instruction may cause the SEE device to stop generating hashes for the instructions of the function executing in the processor. The stop hash instruction may cause the SEE device to stop generating hashes of the instructions following a pop instruction for managing data of a stack. In other words, a hash of the pop instruction may be generated before stopping generating hashes for the instructions of the function executing in the processor. The SEE device determining whether to end generating the hashes for the instructions of the function executing in the processor in determination block 908 may be the processor and/or the hash generation hardware.

In response to determining not to end generating the hashes for the instructions of the function executing in the processor (i.e., determination block 908="No"), the SEE device may again generate hashes for the instructions of the function executing in the processor in block 904. The SEE device may receive subsequent instructions for the function executing in the processor and generate hashes for the subsequent instructions. In some embodiments, the SEE device generating the hashes for the instructions of the function executing in the processor in block 904 may be the processor and/or the hash generation hardware.

In response to determining to end generating the hashes for the instructions of the function executing in the processor (i.e., determination block 908="Yes"), the SEE device may retrieve hashes for the function executing in the processor from a designated memory (e.g., secure execution environment dedicated memory 710). The designated memory may be a secure execution environment dedicated memory that may include any memory accessible to the processor, including memory accessible only by the processor, such as a dedicated partition of a memory and/or a processor hardware only accessible memory. The designated memory may store decrypted hashes and functions that may include the hashes and a function identifier of the function for the hashes stored in association with each other. The association may be based on format and or structure of the data of hashes and function identifiers. The SEE device may retrieve hashes relevant to the function executing in the processor. For example, the SEE device may receive the function identifier for the function from the processor and retrieve the hashes associated with the function identifier. In some embodiments, the SEE device retrieving the hashes for the function executing in the processor from the designated memory in block 910 may be the processor, the hash generation hardware, and/or a hash comparator hardware (e.g., hash comparator hardware 712).

In block 912, the SEE device may compare the hashes for the function from the designated memory and the hashes generated for the instructions of the function executing in the processor from the temporary memory. The SEE device may compare the hashes to determine whether the hashes match. For example, the SEE device may compare values of the hashes to determine whether the values of the hashes are the same. The SEE device may compare values of the hashes in any order that may enable the SEE device to compare the hashes of the same instructions from the designated memory and generated from the function executing in the processor. In some embodiments, the SEE device comparing the hashes for the function from the designated memory and the hashes generated for the instructions of the function executing in the processor from the temporary memory in block 912 may be the processor and/or a hash comparator hardware.

In block 914, the SEE device may determine whether the hashes for the function from the designated memory and the hashes generated for the instructions of the function being executed match. From the comparison in block 912, the SEE device may determine whether the hashes match. All matching hash results of the comparisons may be an indication that execution of the function is secure. Any nonmatching hash results of the comparisons may be an indication that execution of the function is not secure. In some embodiments, the SEE device determining whether the hashes for the function from the designated memory and the hashes generated for the instructions of the function being executed match in determination block 914 may be the processor and/or the hash comparator hardware.

In response to the SEE device determining that the hashes for the function from the designated memory and the hashes generated for the instructions of the function being executed match (i.e., determination block 914="Yes"), the SEE device may trigger a reset of the SEE device in block 916. The SEE device may signal and implement a dump of data for the function executing in the processor. For example, the SEE device may dump data for generating the hashes, data stored in the temporary memory, and/or data used for comparing the hashes. As another example, the SEE device may reset states of components or portions of the SEE device for generating the hashes, storing data in the temporary memory, and/or comparing the hashes. In some embodiments, the SEE device triggering the reset of the SEE device in block 916 may be the processor and/or the hash comparator hardware.

In response to determining that the start hash instruction does not exist for the function executing in the processor (i.e., determination block 902="No"); or in response to the SEE device determining that the hashes for the function from the designated memory and the hashes generated for the instructions of the function being executed do not match (i.e., determination block 914="No"), the SEE device may issue an exception in block 918. The SEE device may issue the exception to the processor executing the function. The exception may indicate to the processor that execution of the function is not secure, which may trigger the processor to handle the not secure function execution. For example, the processor may dump data generated through execution of the function, preventing another function or output from the processor from using the data. In some embodiments, the SEE device issuing the exception in block 918 may be the processor and/or the hash comparator hardware.

In some embodiments, blocks 910-918 may be implemented in parallel with blocks 904-908. A such, rather than waiting for an end to generating hashes for instructions of the function executing in the processor, blocks 910-918 may be implemented prior to ending generating hashes for instructions of the function executing in the processor. For example, blocks 910-918 may be implemented for each hash of an instruction of the function executing in the processor as the hash is generated until a hash of a last instruction is generated, which may be determined in a similar manner as described herein for block 908. Some such embodiments may forego block 906, and the SEE device may compare hashes for the function from the designated memory and the hashes generated for the instructions of the function executing in the processor as the hashes are generated in block 912. In some such embodiments, block 916 may be implemented following generating a hash of a last instruction, which may be determined in a similar manner as described herein for block 908.

Figure 10:
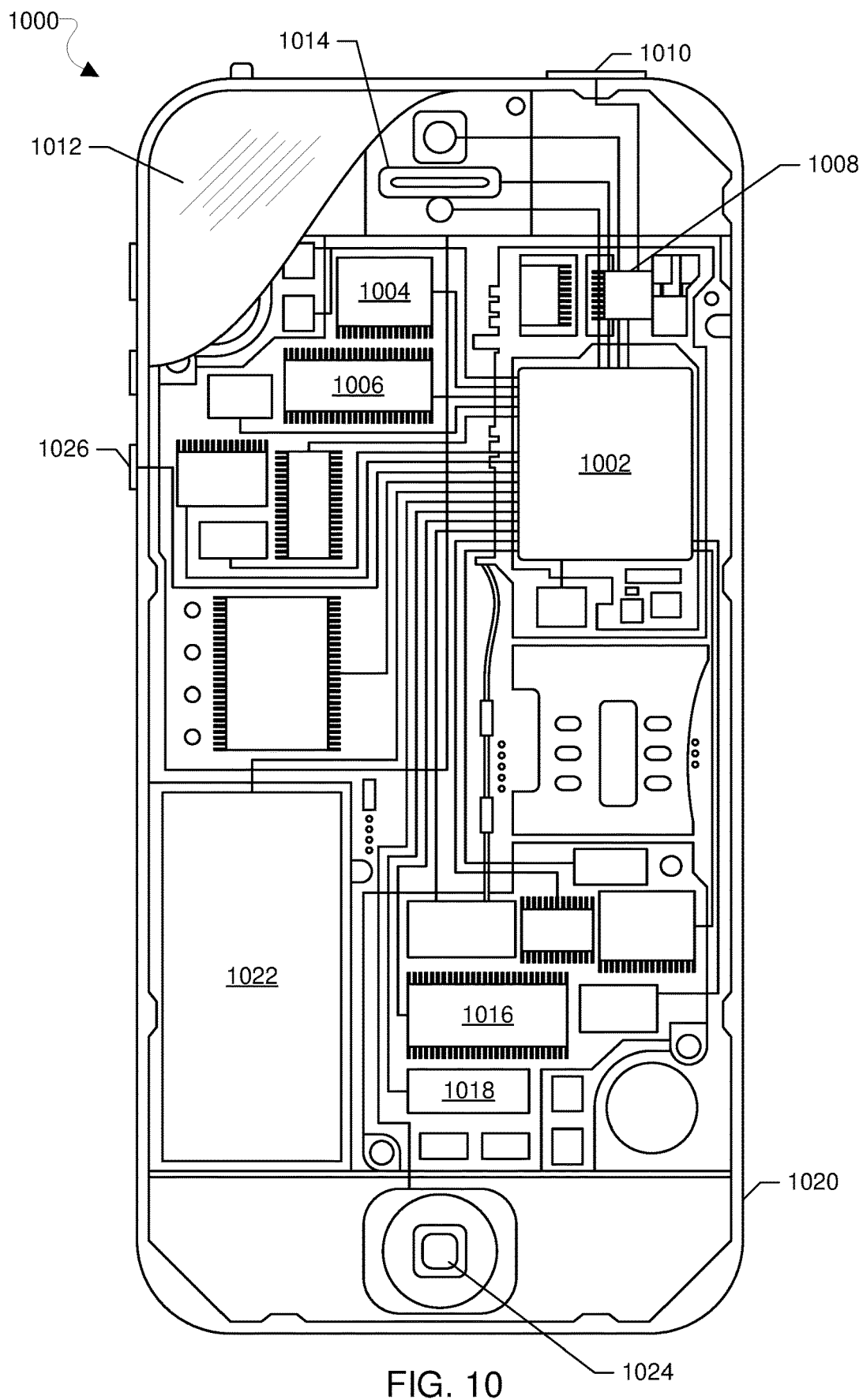
FIG. 10 is a component block diagram illustrating an example mobile computing device suitable for implementing various embodiments.

A system in accordance with the various embodiments (including, but not limited to, embodiments described above with reference to FIGS. 1-9) may be implemented in a wide variety of computing systems including mobile computing devices, an example of which suitable for use with the various embodiments is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the mobile computing device 1000 need not have touch screen capability.

The mobile computing device 1000 may have one or more radio signal transceivers 1008 (e.g., Peanut, Bluetooth, ZigBee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as Universal Serial Bus (USB), FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components described herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
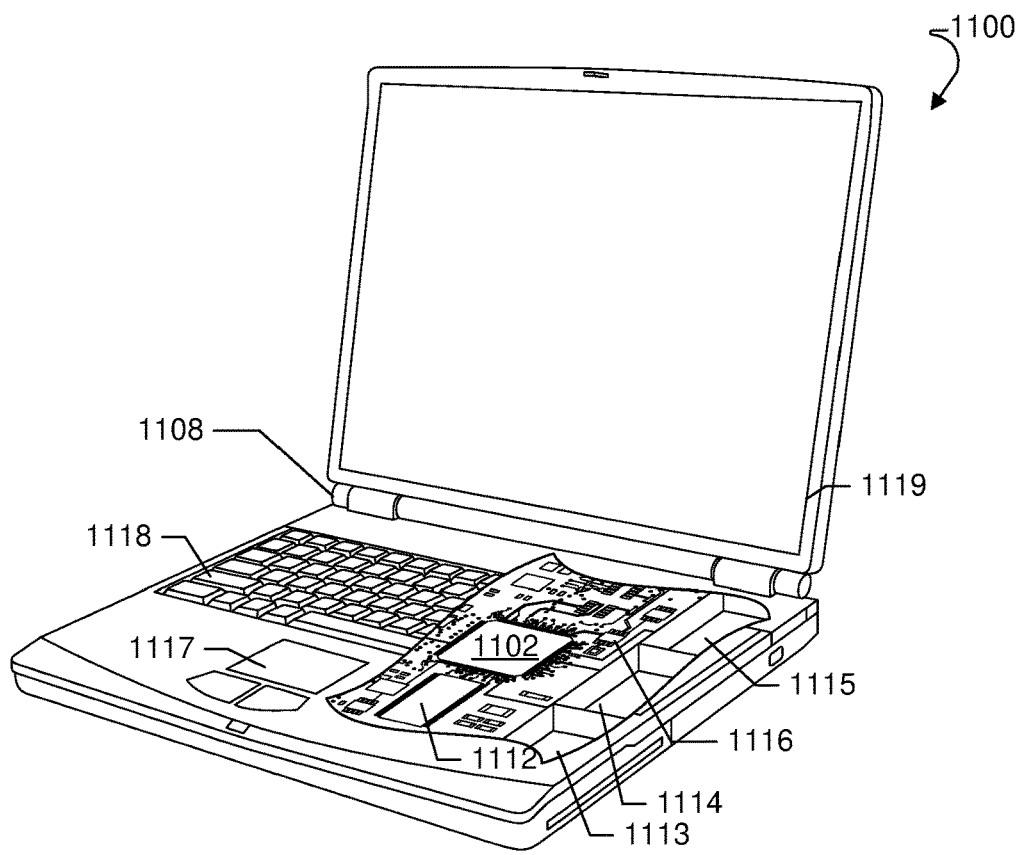
FIG. 11 is a component block diagram illustrating an example mobile computing device suitable for implementing various embodiments.

A system in accordance with the various embodiments (including, but not limited to, embodiments described above with reference to FIGS. 1-9) may be implemented in a wide variety of computing systems include a laptop computer 1100 an example of which is illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1102 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1102. The computer 1100 may also include a floppy disc drive 1114 and a compact disc (CD) drive 1115 coupled to the processor 1102. In a notebook configuration, the computer housing includes the touchpad 1117, the keyboard 1118, and the display 1119 all coupled to the processor 1102. Other configurations of the computing device may include a computer mouse or trackball coupled to the processor (e.g., via a USB input) as are well known, which may also be used in conjunction with the various embodiments.

Figure 12:
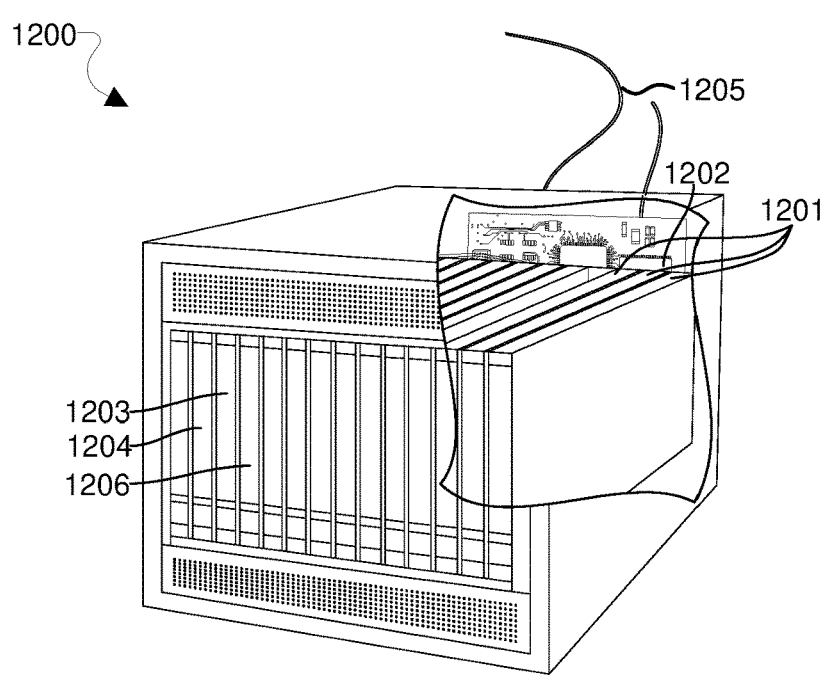
FIG. 12 is a component block diagram illustrating an example server suitable for implementing various embodiments.

A system in accordance with the various embodiments (including, but not limited to, embodiments described above with reference to FIGS. 1-9) may also be implemented in fixed computing systems, such as any of a variety of commercially available servers. An example server 1200 is illustrated in FIG. 12. Such a server 1200 typically includes one or more multicore processor assemblies 1201 coupled to volatile memory 1202 and a large capacity nonvolatile memory, such as a disk drive 1204. As illustrated in FIG. 12, multicore processor assemblies 1201 may be added to the server 1200 by inserting them into the racks of the assembly. The server 1200 may also include a floppy disc drive, compact disc (CD) or digital versatile disc (DVD) disc drive 1206 coupled to the multicore processor assemblies 1201. The server 1200 may also include network access ports 1203 coupled to the multicore processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Implementation examples are described in the following paragraphs. While some of the following implementation examples are described in terms of example methods, further example implementations may include: the example methods discussed in the following paragraphs implemented in a computing device comprising a processing device configured with processing device-executable instructions to perform operations of the example methods; the example methods discussed in the following paragraphs implemented in a computing device including a hash generator, a hash comparator, and/or a processor configured to perform operations of the example methods; the example methods discussed in the following paragraphs implemented in a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A computing device method of generating a binary executable file for execution in a secure execution environment, the method including generating hashes of instructions of a function, inserting a start hash instruction and a stop hash instruction in object code of the function, and generating a binary executable having the function including the start hash instruction and the stop hash instruction.

Example 2. The method of example 1, in which inserting the hash start instruction and the stop hash instruction in the object code of the function includes inserting the start hash instruction in a prologue of the function, and inserting the stop hash instruction in an epilogue of the function.

Example 3. The method of any of examples 1 or 2, further including encrypting a program header for the hashes of the instructions of the function, and storing the encrypted program header for the hashes of the instructions of the function to a dedicated memory.

Example 4. The method of any of examples 1-3, further including receiving an indication of a hash algorithm using a software development toolchain, in which generating the hashes of the instructions of the function may include generating the hashes of the instructions of the function using the indicated hash algorithm (i.e., identified in the indication of the hash algorithm).

Example 5. The method of any of examples 1-4, further including receiving a private key using a software development toolchain, and encrypting a program header for the hashes of the instructions of the function using an encryption algorithm and the private key.

Example 6. The method of any of examples 1-5, further including receiving an indication of an encryption algorithm using a software development toolchain, and encrypting a program header for the hashes of the instructions of the function using the indicated encryption algorithm (i.e., identified in the indication of the encryption algorithm).

Example 7. The method of any of examples 1-6, in which generating the hashes of the instructions of the function includes generating the hashes of the instructions of the function using an assembler, inserting a start hash instruction and a stop hash instruction in the object code of the function may include inserting the start hash instruction and the stop hash instruction in the object code of the function using the assembler, and generating the binary executable having the function including the start hash instruction and the stop hash instruction includes generating the binary executable having the function including the start hash instruction and the stop hash instruction using a linker.

Example 8. A method performed at a secure execution environment of a processor at runtime to maintain the secure execution environment, includes generating hashes of instructions of a function in parallel with executing the function, comparing the generated hashes of the instructions of the function to stored hashes of instructions of the function, and issuing an exception indicating to the processor that execution of the function is not secure for any difference between the generated hashes of the instructions of the function and the stored hashes of the instructions of the function.

Example 9. The method of example 8, further including determining whether a start hash instruction exists for the function, in which generating the hashes of the instructions of the function in parallel with executing the function includes generating the hashes of the instructions of the function in response to determining that the start hash instruction exists for the function, and issuing an exception indicating to the processor that execution of the function is not secure in response to determining that the start hash instruction does not exist for the function.

Example 10. The method of any of examples 8 or 9, further including determining whether to end generating the hashes of the instructions of the function based on reaching a stop hash instruction for the function, in which comparing the generated hashes of the instructions of the function to stored hashes of the instructions of the function occurs in response to determining to end generating the hashes of the instructions of the function.

Example 11. The method of any of examples 8-10, further including determining whether the secure execution environment is enabled for the processor, in which generating the hashes of the instructions of the function in parallel with executing the function occurs in response to determining that the secure execution environment is enabled for the processor.

Example 12. The method of any of examples 8-12, further including decrypting an encrypted stored program header for hashes of instructions of the function generating a decrypted program header for hashes of the instructions of the function, and retrieving stored hashes of the instructions of the function from a dedicated memory based on the decrypted program header for hashes of the instructions of the function.

Example 13. The method of example 12, further including determining whether the encrypted stored program header for hashes of the instructions of the function exist in the dedicated memory, in which decrypting the encrypted stored program header for hashes of the instructions of the function occurs in response to determining that the encrypted stored program header for hashes of the instructions of the function exist in the dedicated memory.

Computer program code or "program code" for execution on a programmable processor for carrying out operations of the various embodiments may be written in a high level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed in circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of generating a binary executable for execution in a secure execution environment, comprising:
    generating hashes of instructions of a function using an assembler;
    inserting a start hash instruction and a stop hash instruction in object code of the function; and
    generating a binary executable having the function including the start hash instruction and the stop hash instruction.

2. The method of claim 1, wherein inserting the start hash instruction and the stop hash instruction in the object code of the function includes:
    inserting the start hash instruction in a prologue of the function; and
    inserting the stop hash instruction in an epilogue of the function.

3. The method of claim 1, further comprising:
    encrypting a program header for the hashes of the instructions of the function; and
    storing the encrypted program header for the hashes of the instructions of the function to a dedicated memory.

4. The method of claim 1, further comprising receiving an indication of a hash algorithm using a software development toolchain, wherein generating the hashes of the instructions of the function comprises generating the hashes of the instructions of the function using the indicated hash algorithm.

5. The method of claim 1, further compromising:
    receiving a private key using a software development toolchain; and
    encrypting a program header for the hashes of the instructions of the function using an encryption algorithm and the private key.

6. The method of claim 1, further compromising:
    receiving an indication of an encryption algorithm using a software development toolchain; and
    encrypting a program header for the hashes of the instructions of the function using the indicated encryption algorithm.

7. The method of claim 1, wherein;
    inserting the start hash instruction and the stop hash instruction in the object code of the function comprises inserting the start hash instruction and the stop hash instruction in the object code of the function using the assembler; and
    generating the binary executable having the function including the start hash instruction and the stop hash instruction comprises generating the binary executable having the function including the start hash instruction and the stop hash instruction using a linker.

8. A computing device, comprising:
    a memory; and
    a processor coupled to the memory and configured to:
        generate hashes of instructions of a function using an assembler;
        insert a start hash instruction and a stop hash instruction in object code of the function; and
        generate a binary executable having the function including the start hash instruction and the stop hash instruction.

9. The computing device of claim 8, wherein the processor is further configured to cause the processor to insert the start hash instruction and the stop hash instruction in the object code of the function in a manner that:
    inserts the start hash instruction in a prologue of the function; and
    inserts the stop hash instruction in an epilogue of the function.

10. The computing device of claim 8, wherein the processor is further configured to:
    encrypt a program header for the hashes of the instructions of the function; and
    store the encrypted program header for the hashes of the instructions of the function in the memory.

11. The computing device of claim 8, wherein the processor is further configured to:
    receive an indication of a hash algorithm at a software development toolchain; and
    generate the hashes of the instructions of the function using the indicated hash algorithm.

12. The computing device of claim 8, wherein the processor is further configured to:

receive a private key at a software development toolchain; and encrypt a program header for the hashes of the instructions of the function using an encryption algorithm and the private key.

13. The computing device of claim 8, wherein the processor is further configured to:

receive an indication of an encryption algorithm at a software development toolchain; and encrypt a program header for the hashes of the instructions of the function using the indicated encryption algorithm.

14. The computing device of claim 8, wherein the processor is further configured to:

insert the start hash instruction and the stop hash instruction in the object code of the function using the assembler; and generate the binary executable having the function including the start hash instruction and the stop hash instruction using a linker.

* * * * *